United States Patent
Yasuda

(10) Patent No.: US 8,738,954 B2
(45) Date of Patent: May 27, 2014

(54) POWER SOURCE CIRCUIT AND CONTROL METHOD THEREOF

(75) Inventor: Hitoshi Yasuda, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 13/273,791

(22) Filed: Oct. 14, 2011

(65) Prior Publication Data

US 2012/0104853 A1    May 3, 2012

(30) Foreign Application Priority Data

Oct. 28, 2010 (JP) .................................. 2010-242650

(51) Int. Cl.
*G06F 1/00* (2006.01)

(52) U.S. Cl.
USPC .......................................... 713/340; 713/320

(58) Field of Classification Search
USPC ................................. 713/300–340
See application file for complete search history.

(56) References Cited

U.S. PATENT DOCUMENTS

| | | | |
|---|---|---|---|
| 7,734,937 B2 * | 6/2010 | Yano et al. ..................... | 713/300 |
| 8,335,940 B2 * | 12/2012 | Umezu ......................... | 713/340 |
| 2004/0090806 A1 * | 5/2004 | Yoshida et al. ................. | 363/60 |
| 2009/0327766 A1 * | 12/2009 | Ghoshal et al. ............... | 713/300 |

FOREIGN PATENT DOCUMENTS

| | | | |
|---|---|---|---|
| JP | 2007-036832 | * | 2/2007 |
| JP | 2007-36832 A | | 2/2007 |

* cited by examiner

*Primary Examiner* — Faisal M Zaman
*Assistant Examiner* — Kim Huynh
(74) *Attorney, Agent, or Firm* — Carter, DeLuca, Farrell & Schmidt, LLP

(57) ABSTRACT

There is provided a power source circuit (100) which supplies power from a first power source (1) when the first power source that stops feeding upon consumption of a current of a predetermined value or more, and a second power source (9) lower in voltage than the first power source are connected simultaneously. The power source circuit includes a switching unit (5) which controls power supply from a control unit (2) for controlling feeding from the first power source, a charge accumulation unit (3) which accumulates charges between the control unit and the switching unit, and a charging detection unit (4) which outputs, to the switching unit, a signal for performing the power supply when it is detected that the difference between a voltage charged in the charge accumulation unit and a feed voltage from the control unit is equal to or smaller than a designated value.

12 Claims, 4 Drawing Sheets

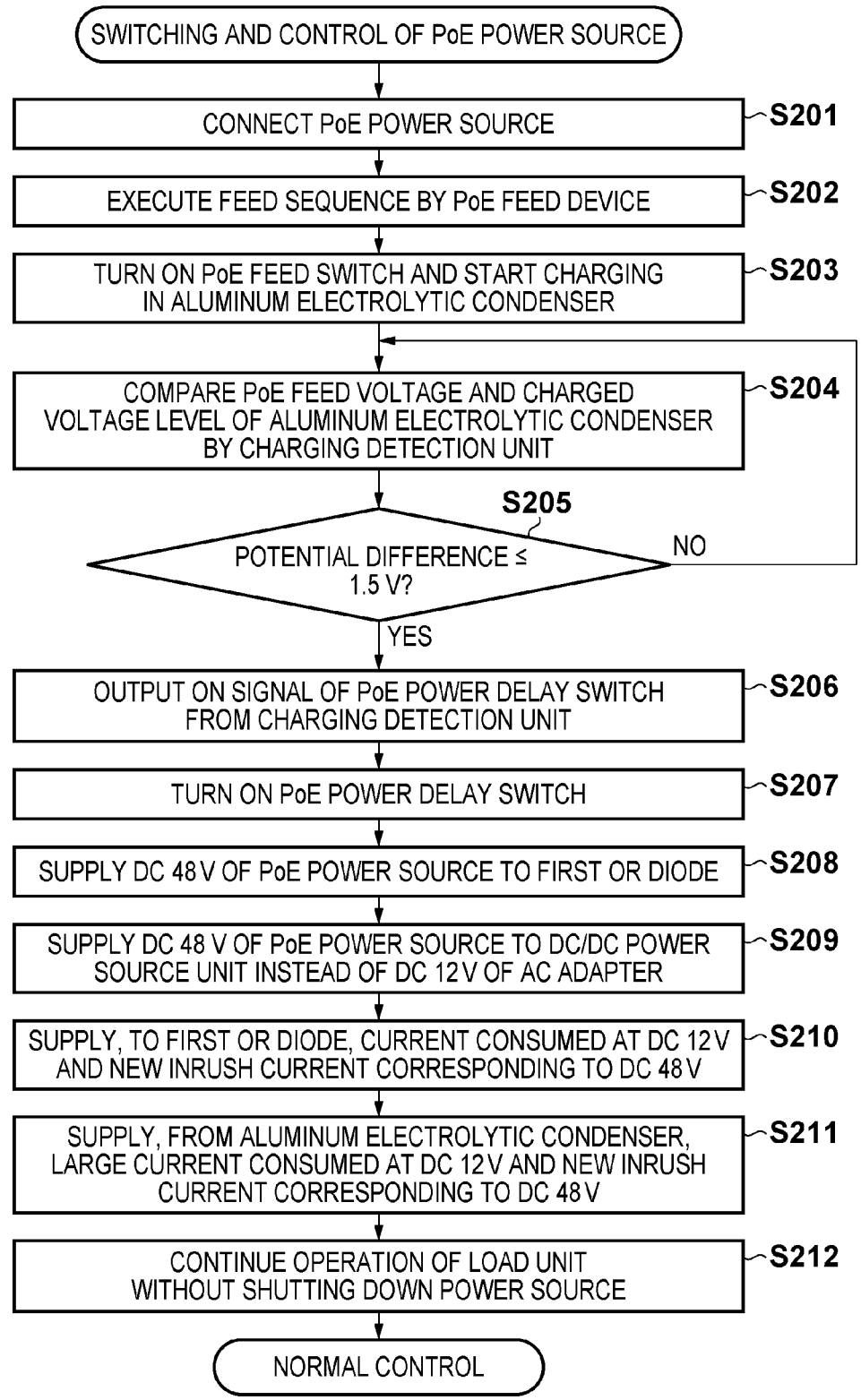

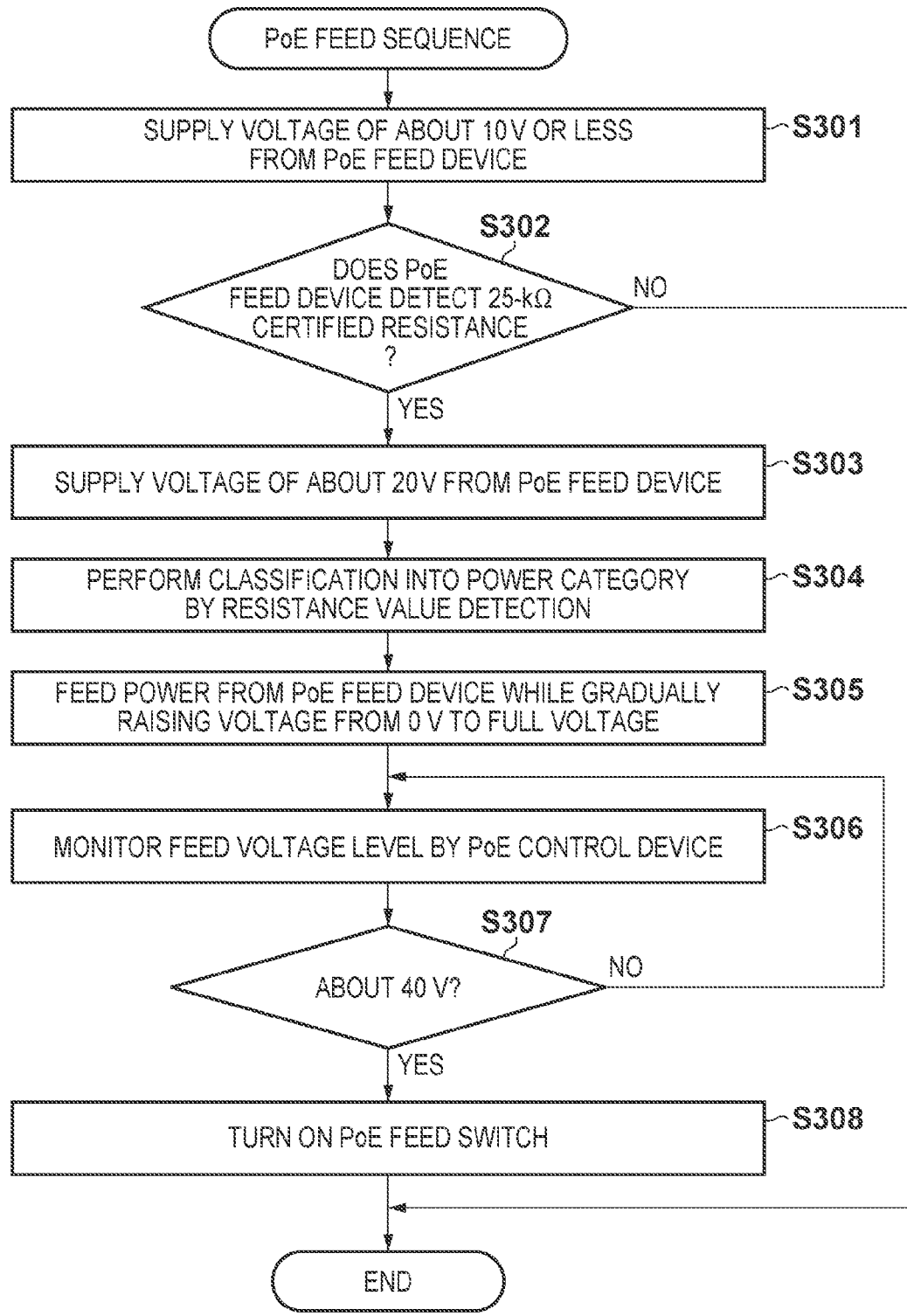

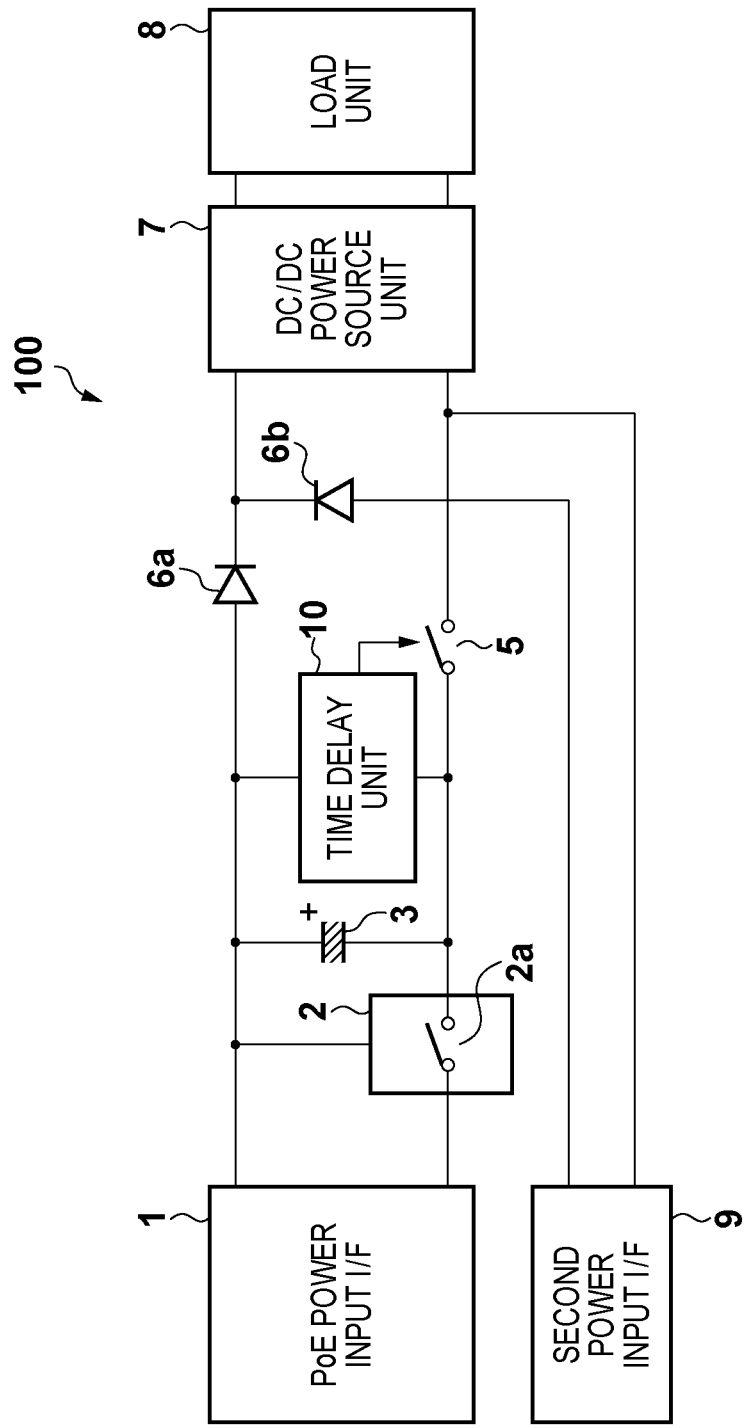

POWER SOURCE CIRCUIT AND CONTROL METHOD THEREOF

BACKGROUND OF THE INVENTION

1. Field of the Invention

The present invention relates to a power source circuit having a function of supplying power via a communication line.

2. Description of the Related Art

Recently, there is known a method of feeding power from a power source to an apparatus via an Ethernet® cable. This method complies with the IEEE802.3af standard and is called Power over Ethernet® (to be referred to as PoE). In the IEEE802.3af standard, when a predetermined current or more is consumed, the PoE feed device activates overload protection to stop feeding from the PoE power source. The maximum limit current value of overload protection is 400 mA. The minimum limit current value is obtained by dividing a maximum power consumption of 15.4 W by the PoE feed voltage. The PoE feed voltage ranges from DC 36 V to DC 57 V. That is, the overcurrent limit value is 270 mA to 400 mA when the PoE feed voltage is DC 57 V, 320 mA to 400 mA when it is DC 48 V, and 400 mA when it is DC 37 V.

Of the apparatuses designed to operate by the PoE power source, some are designed to be operated by even a general-purpose power source such as an AC adapter other than the PoE power source due to the convenience of installation. There is known an apparatus which, when both the PoE power source and general-purpose power source are connected, operates by giving priority to feeding from either power source (for example, Japanese Patent Laid-Open No. 2007-36832). The following problem arises in conventional specifications which give priority to the PoE power source.

Upon switching from a state in which the apparatus operates by the AC adapter (for example, DC 12 V) to a state in which it operates by the PoE power source (for example, DC 48 V), a subsequent switching power source unit instantaneously tries to draw a current consumed at DC 12 V directly from DC 48 V. Since the voltage switches from DC 12 V to DC 48 V, a further inrush current is generated for a capacitive component at the input stage of the switching power source unit. As a result, more than a specified current is drawn from the PoE control device. Overcurrent protection of the PoE feed device acts, stopping supply from the PoE power source. For this reason, a power source circuit with a large amount of load power that gives priority to the PoE power source generally permits the power source to be stopped upon switching to the PoE power source. This problem occurs not only in the PoE power source but also in a power source which stops feeding upon consumption of a predetermined current or more. Another conventional method uses an input voltage from the general-purpose power source after boosting it to a high voltage. The difference between the PoE power source and the general-purpose power source is reduced to prevent an overcurrent from flowing even upon switching to the PoE power source.

However, this conventional method needs to add a booster circuit. This results in high component cost, large substrate size, low power source efficiency, and large amounts of heat being generated.

SUMMARY OF THE INVENTION

The present invention provides a power source circuit which does not need the addition of a new booster circuit even when amount of power of a load circuit is large, and smoothly switches from a general-purpose power input to a PoE power input without causing power to shutdown, in order to solve the above problems.

To achieve the above object, a power source circuit according to the present invention comprises the following arrangement. That is, a power source circuit configured to supply power from a first power source when the first power source which stops feeding upon consumption of a current of not less than a predetermined value, and a second power source lower in voltage than the first power source are simultaneously connected comprises a control unit adapted to control feeding from the first power source, a switching unit adapted to control power supply from the control unit, a charge accumulation unit adapted to accumulate charges between the control unit and the switching unit, and a charging detection unit adapted to detect whether a difference between a charged voltage charged in the charge accumulation unit and a feed voltage from the control unit is not larger than a designated value, wherein when the difference is detected to be not larger than the designated value, the charging detection unit outputs, to the switching unit, a signal for performing the power supply.

As described above, the present invention can provide a power source circuit which need not add a new booster circuit even when power of a load circuit is large, and smoothly switches from a general-purpose power input to a PoE power input without causing power to shutdown.

Further features of the present invention will become apparent from the following description of exemplary embodiments with reference to the attached drawings.

BRIEF DESCRIPTION OF THE DRAWINGS

FIG. 2 is a flowchart showing PoE power source switching control in the first embodiment;

FIG. 3 is a flowchart showing a PoE feed sequence; and

FIG. 4 is a block diagram showing a power source control system according to the second embodiment.

DESCRIPTION OF THE EMBODIMENTS

Figure 1:
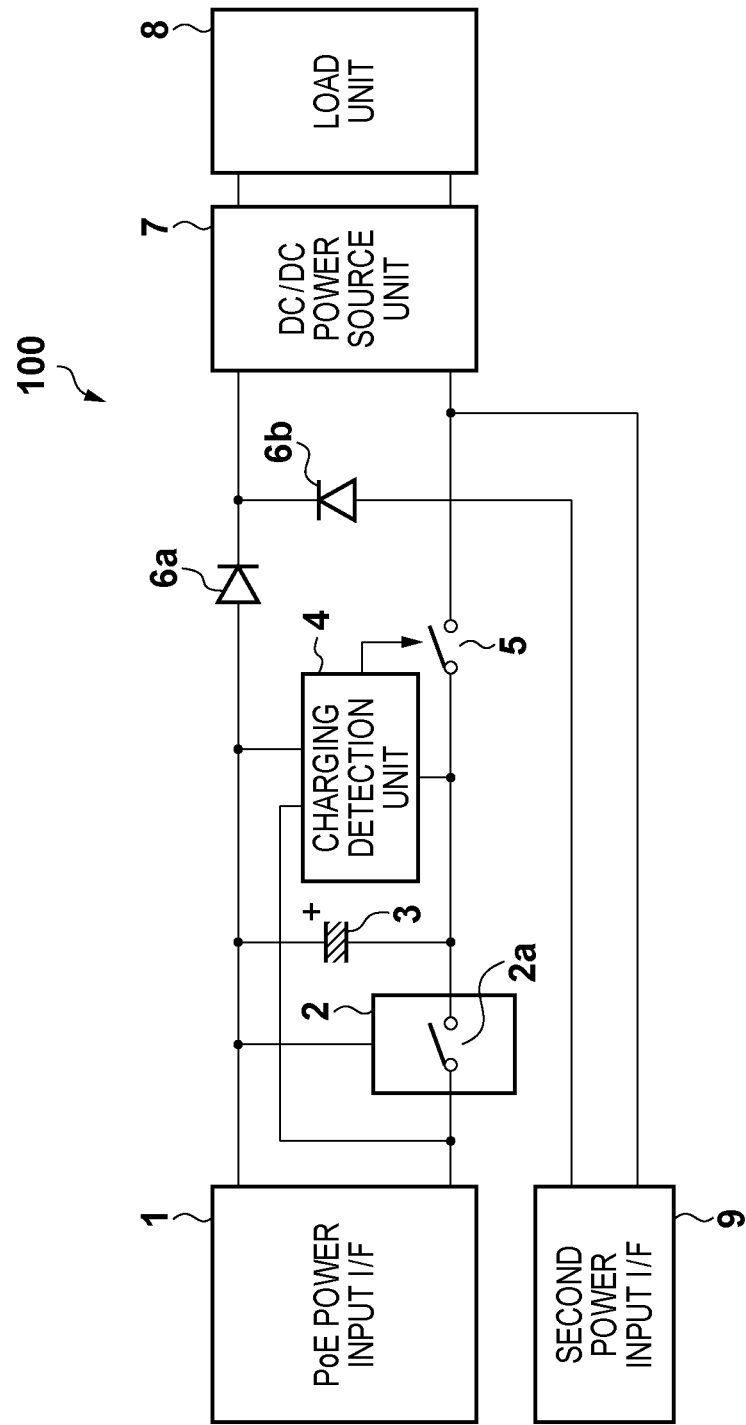
FIG. 1 is a block diagram showing a power source control system according to the first embodiment.

Preferred embodiments of the present invention will now be described in detail with reference to the accompanying drawings.

First Embodiment

FIG. 1 is a block diagram showing a power source control system according to the first embodiment of the present invention.

Referring to FIG. 1, a PoE power input I/F 1 in a power source circuit 100 receives power from a PoE power source (DC 36 V to DC 57 V). In the embodiment, the PoE power source is a power source complying with Power over Ethernet® defined in the IEEE802.3af standard or Power over Ethernet defined in the IEEE802.3 at standard. The PoE power source has a function of activating overload protection in the PoE feed device to stop feeding from the PoE power source upon consumption of a predetermined current or more.

A PoE control unit 2 is a PoE control device complying with the IEEE802.3af standard, and copes with a feed sequence from the PoE feed device (not shown) of the PoE power source. A PoE feed switch 2a in the PoE control device 2 supplies power fed from the PoE feed device to subsequent building elements. In the embodiment, a charge accumulation unit 3 which accumulates charges is formed from an aluminum electrolytic condenser.

A charging detection unit 4 compares a voltage (feed voltage) fed to the PoE control device 2 with a voltage (charged voltage) charged in the aluminum electrolytic condenser 3, and when they become almost equal to each other, outputs a signal to ON-control a subsequent PoE power delay switch 5. For example, "almost equal" means a case in which the difference between the feed voltage and the charged voltage becomes equal to or smaller than a designated value.

The PoE power delay switch 5 ON/OFF-controls power supply. The PoE power delay switch is turned on to supply power from the PoE power source to an OR diode 6a. The PoE power delay switch 5 is turned off to stop power supply to the OR diode 6a. Under ON control by the charging detection unit 4, the PoE power delay switch 5 outputs, to the first OR diode 6a, PoE power which has been output from the PoE control device 2 via the PoE feed switch 2a. When a PoE power from the PoE power input I/F 1 and a power (for example, DC 12 V from the AC adapter) from a second power input I/F 9 that is lower than the PoE power are simultaneously fed, the PoE power of a higher voltage is automatically supplied to a DC/DC power source unit 7.

From the input PoE power (DC 48 V) or the AC adapter power (DC 12 V), the DC/DC power source unit 7 generates a voltage, for example, DC 5 V necessary for an actual load unit 8. The DC/DC power source unit 7 has a function of insulating the primary circuit of the DC/DC power source unit 7 on the power input side from the secondary circuit on the side of the load unit 8. The load unit 8 includes a load circuit. The second power input I/F 9 receives power from a general-purpose power source lower in voltage than the PoE power source. The first embodiment assumes a DC 12 V-output AC adapter (not shown).

In this manner, the power source circuit 100 allows simultaneously connecting two power sources, that is, the PoE power source and the second power source lower in voltage than the PoE power source. When the two power sources are connected simultaneously, power is supplied from the PoE power source.

The operation will be explained. First, the AC adapter connected to the second power input I/F 9 inputs DC 12 V. Assuming that power consumption of the load unit 8 is 8 W, a current of about 670 mA (=8 W/12 V) flows through the DC 12 V line by simple calculation. The power source efficiency is 0.7 to 0.9 in practice, but calculation uses a power source efficiency of 1.0 for simplicity. The DC/DC power source unit 7 receives the input DC 12 V via a second OR diode 6b, generates DC 5 V, and feeds it to the load unit 8.

An operation when the PoE power source is connected in this state will be explained with reference to even the flowchart of FIG. 2.

A network cable extending from the feed device (not shown) of the PoE power source is connected to the PoE power input I/F 1 of the power source circuit 100 (step S201). The PoE feed device executes the feed sequence of the PoE power source while gradually raising the voltage to the PoE control device 2 via the PoE power input I/F 1 (step S202). The feed sequence will be described later. As a result of executing the feed sequence, the PoE control device 2 outputs the fed PoE power, and the subsequent aluminum electrolytic condenser 3 starts charging (step S203).

The charging detection unit 4 compares the voltage of the aluminum electrolytic condenser 3 with the fed PoE power source voltage (step S204). The charging detection unit 4 determines whether the potential difference is equal to or smaller than a predetermined value (for example, 1.5 V) (step S205). If the charging detection unit 4 determines that the potential difference is larger than the predetermined value (NO in step S205), the process returns to step S204. If the charging detection unit 4 determines that the potential difference is equal to or smaller than the predetermined value (YES in step S205), it outputs an ON signal to the PoE power delay switch 5 to turn on the subsequent PoE power delay switch 5 (step S206).

In response to this, the PoE power delay switch 5 is turned on (step S207). The PoE power source supplies DC 48 V to the first OR diode 6a (step S208). The first OR diode 6a supplies DC 48 V to the DC/DC power source unit 7 (step S209). As a result, the use of the lower voltage of DC 12 V from the AC adapter automatically stops. That is, the voltage supplied to the DC/DC power source unit 7 switches from DC 12 V to DC 48 V, but the current itself cannot abruptly switch to 167 mA (=8 W/48 V) corresponding to DC 48 V. A current of 670 mA consumed at DC 12 V tries to temporarily flow even at the moment of switching to DC 48 V, and flows into the DC/DC power source unit 7 via the first OR diode 6a (step S210). A capacitive component exists even at the input stage of the DC/DC power source unit 7. When the supplied voltage rises from DC 12 V to DC 48 V, an inrush current is generated owing to the capacitive component. Even this inrush current flows into the DC/DC power source unit 7 via the first OR diode 6a (step S210).

Conventionally, the aluminum electrolytic condenser 3 has not been arranged, so 670 mA+inrush current tries to flow via the PoE control device 2. As a result, the current reaches the overcurrent protection limit value (maximum of 400 mA) of the PoE feed device, and supply from the PoE power source stops. However, in the first embodiment, the temporal 670 mA+inrush current is supplied from the aluminum electrolytic condenser 3 (step S211), and overcurrent protection of the PoE feed device does not act. Instantaneously upon switching to the PoE power source, the load unit 8 can keep operating without shutting down the power source (step S212).

An outline of the feed sequence in step S202 will be explained with reference to FIG. 3.

The PoE feed device supplies a voltage of about 10 V or less (step S301). The PoE feed device determines whether a 25-kΩ certified resistance is connected (step S302). If the PoE feed device determines that no 25-kΩ certified resistance is connected (NO in step S302), the process ends. If the PoE feed device determines that a 25-kΩ certified resistance is connected (YES in step S302), the process advances to step S303. By detecting the certified resistance, the PoE feed device recognizes that the PoE power source is coped with.

The PoE feed device supplies a voltage of about 20 V (step S303). The PoE feed device performs classification into a power category on the power supplied side (step S304). The classification is done by detecting a classification resistance value set in the PoE control device 2. There are five power categories up to a maximum of 12.95 W. Power classification enables efficient power distribution on the PoE feed device side. After the end of power category classification, the PoE feed device feeds power while gradually raising the voltage from 0 V to a full voltage (44 V to 57 V) (step S305). The PoE control device 2 monitors the fed voltage level (step S306). The PoE control device 2 determines whether the voltage level has reached a predetermined value (about 40 V (for example, a range of 39.5 V to 41.5 V)) (step S307). If the PoE control device 2 determines that the voltage level has not reached the predetermined value (NO in step S307), the process returns to step S306. If the PoE control device 2 determines that the voltage level has reached the predetermined value (YES in step S307), it turns on the PoE feed switch 2a (step S308). Then, a voltage fed from the PoE feed device is output to the subsequent stage of the PoE control device 2. The aluminum electrolytic condenser 3 is gradually charged, and the voltage across it also gradually rises.

An outline of the feed sequence has been described.

As described above, according to the first embodiment, the aluminum electrolytic condenser 3 is arranged at the subsequent stage of the PoE control device 2 in the power source circuit. Even if power in the load circuit is large, generation of power shutdown upon switching from the general-purpose power source to the PoE power source can be prevented. The power shutdown can therefore be prevented in an apparatus which is greatly affected by temporal power shutdown, such as a monitoring camera which aims at continuous image capturing/recording.

Second Embodiment

FIG. 4 is a block diagram showing a power source control system according to the second embodiment. Note that the same reference numerals as those in FIG. 1 denote the same parts. The power source control system of FIG. 4 is different from that of FIG. 1 in that a time delay unit 10 replaces the charging detection unit 4. The time delay unit 10 monitors the start timing of a voltage rise of an aluminum electrolytic condenser 3. The time delay unit 10 outputs a signal to ON-control a subsequent PoE power delay switch 5 after a predetermined time is elapsed from the start of the rise. In FIG. 1, when a charging detection unit 4 detects that the aluminum electrolytic condenser 3 is fully charged, the PoE power delay switch 5 is turned on. In the second embodiment, the timing till full charging after the start of charging is managed by the elapsed time.

If a PoE control device 2 is configured to detect the timing to turn on a PoE feed switch 2a, this signal is usable as a charging start timing signal instead of detecting the start of a voltage rise of the aluminum electrolytic condenser 3 by the time delay unit 10.

As described above, according to the second embodiment, the time delay unit 10 is arranged at the subsequent stage of the PoE control device 2 in the power source circuit. Even if power in the load circuit is large, generation of power shutdown upon switching from the general-purpose power source to the PoE power source can be prevented.

In the first and second embodiments, an output signal from the charging detection unit 4 or time delay unit 10 is used as the ON control signal of the PoE power delay switch 5. However, if the PoE control device 2 outputs an equivalent signal, this signal is usable. The charging detection unit 4 or time delay unit 10 may be formed by only electrical hardware or using a programmed microcomputer.

In other words, the charging detection unit 4 or time delay unit 10 functions as a control signal output control unit which controls output of the ON control signal of the PoE power delay switch 5.

The present invention has been described in detail based on preferred embodiments. However, the present invention is not limited to these specific embodiments, and includes various forms without departing from the scope of the invention.

Other Embodiments

Aspects of the present invention can also be realized by a computer of a system or apparatus or devices such as a CPU or MPU that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-242650, filed Oct. 28, 2010, which is hereby incorporated by reference herein in its entirety.

What is claimed is:

1. A power source circuit configured to supply power from a first power source and a second power source to a load unit, comprising:
   a charge accumulation unit configured to accumulate charges charged by the first power source while the power from the second power source lower in voltage than the first power source is being supplied to the load unit, and configured to supply accumulated charges to the load unit when a power source for supplying power to the load unit is switched from the second power source to the first power source; and
   a first switching unit configured to switch, when the charge accumulation unit accumulates the charge, the power source for supplying power to the load unit from the second power source to the first power source.

2. The circuit according to claim 1, further comprising:
   a second switching unit configured to supply a voltage from the first power source to the charge accumulation unit; and
   a control unit configured to control, when a voltage charged from the first power source has reached a predetermined value, the second switching unit to supply the voltage from the first power source to the charge accumulation unit.

3. The circuit according to claim 1, wherein the first power source is a PoE power source complying with one of Power over Ethernet® defined in an IEEE802.3af standard and Power over Ethernet defined in an IEEE802.3 at standard.

4. The circuit according to claim 1, further comprising a detection unit configured to detect a voltage charged in the charge accumulation unit,
   wherein the first switching unit switches, when the detection unit detects that the charge accumulation unit is charged to a predetermined value of voltage, a power source for supplying the power for the load unit from the second power source to the first power source.

5. The circuit according to claim 1, further comprising a detection unit configured to detect a voltage charged in the charge accumulation unit,
   wherein the first switching unit switches, when a difference between a voltage charged in the charge accumulation unit and a feed voltage from the first power source is not larger than a designated value, a power source for supplying the power for the load unit from the second power source to the first power source.

6. The circuit according to claim 1, wherein the first switching unit switches, when a predetermined time is elapsed from a start of charging in the charge accumulation unit, a power source for supplying the power for the load unit from the second power source to the first power source.

7. The circuit according to claim 1, further comprising:
   a first connection unit configured to connect to the first power source; and
   a second connection unit configured to connect to the second power source lower in voltage than the first power source.

8. The circuit according to claim 1, wherein the first power source stops feeding upon consumption of a current of not less than a predetermined value, and
   wherein the charge accumulation unit supplies a current of more than the predetermined value to the load unit when the power source for supplying power to the load unit is switched from the second power source to the first power source.

9. A method of controlling a power source circuit configured to supply power from a first power source and a second power source to a load unit, comprising:
   accumulating charges charged by the first power source in a charge accumulation unit while the power from the second power source lower in voltage than the first power source is being supplied to the load unit;
   supplying accumulated charges to the load unit when a power source for supplying power to the load unit is switched from the second power source to the first power source; and
   switching, when the charge accumulation unit accumulates the charge, the power source for supplying power to the load unit from the second power source to the first power source.

10. The method according to claim 9, further comprising:
    detecting a voltage charged in the charge accumulation unit; and
    switching, when it is detected that the charge accumulation unit is charged to a predetermined value of voltage, a power source for supplying the power for the load unit from the second power source to the first power source.

11. The method according to claim 9, further comprising switching, when a predetermined time is elapsed from a start of charging in the charge accumulation unit, a power source for supplying the power for the load unit from the second power source to the first power source.

12. The method according to claim 9, wherein the first power source stops feeding upon consumption of a current of not less than a predetermined value, and
    wherein supplying a current of more than the predetermined value to the load unit when the power source for supplying power to the load unit is switched from the second power source to the first power source.

* * * * *